United States Patent [19]
Mochizuki et al.
[11] Patent Number: 4,870,258
[45] Date of Patent: Sep. 26, 1989

[54] PAGE TURNING APPARATUS

[75] Inventors: Akira Mochizuki, Ibaragi; Masataka Kawauchi, Ishioka; Kenichiro Takezawa, Seto; Jyunichi Matsuno, Toride; Kihachiro Tanaka, Ushihisa; Shinobu Yoshida, Ibaragi, all of Japan

[73] Assignee: Hitachi, Ltd., Tokyo, Japan

[21] Appl. No.: 27,934

[22] Filed: Mar. 19, 1987

[30] Foreign Application Priority Data

Mar. 19, 1986 [JP] Japan .................................. 61-59179
Aug. 20, 1986 [JP] Japan .................................. 61-192671

[51] Int. Cl.[4] .............................................. G06F 15/30
[52] U.S. Cl. ...................................... 235/379; 400/25; 400/636
[58] Field of Search .................... 235/379; 400/25, 28, 400/636, 595, 596; 101/271, 229, 230, 231, 232

[56] References Cited

U.S. PATENT DOCUMENTS

| | | | |
|---|---|---|---|
| 4,280,036 | 7/1981 | Fukatsu | 235/379 |
| 4,488,367 | 12/1984 | Yamauchi et al. | 235/379 X |
| 4,511,970 | 4/1985 | Okano et al. | 235/379 X |
| 4,516,866 | 5/1985 | Yamauchi et al. | 101/232 X |
| 4,702,470 | 10/1987 | Ishii | 101/232 X |

*Primary Examiner*—A. D. Pellinen
*Assistant Examiner*—Anthony J. Wysocki
*Attorney, Agent, or Firm*—Antonelli, Terry & Wands

[57] ABSTRACT

A booklet, such as a passbook is transferred to the position, in which a page turning device is provided, on a base, by a transfer mechanism comprising driving and follower rollers. During a page turning operation, the booklet is pressed from the rear side thereof against the page turning device by a pressing force which is varied in accordance with the rigidity of the paper in the booklet. The page turning device is turned with the booklet, pressed against the same, to transfer the booklet at a speed according to the turning condition of the uppermost paper in the booklet, whereby the page turning operation is carried out.

29 Claims, 15 Drawing Sheets

PAGE TURNING APPARATUS

BACKGROUND OF THE INVENTION

This invention relates to a page turning apparatus for booklets, and more particularly to a page turning apparatus for booklets, which is suitably used for turning the pages of a passbook in a passbook printer in the bank terminal equipment.

As disclosed in, for example, the specification of U.S. Pat. No. 4,280,036, a page turning apparatus is provided with a roller for transferring a booklet, a friction roller adapted to contact the free end portion of the booklet and turn a page thereof, and a pressure member adapted to press the free end portion of the booklet against the friction roller with a predetermined level of pressing force.

When a page of a booklet consisting of a passbook inserted in such a structure is turned over, the pageturning friction roller is turned toward the binding thread of the passbook with the friction roller contacting a cover or a leaf thereof, to thereby carry out an object operation so that the deformation curves of the left and right portions of the cover (consisting usually of thicker paper) or leaf (consisting usually of thinner paper) with respect to the direction of the binding thread become substantially symmetrical. However, in this structure, no sufficient consideration is given to the page-turning reliability and the ability to recover the shape of a turned page of the structure with respect to a sheet, such as a cover, which has high bending rigidity, and which is coated with a resin having a high surface smoothness.

SUMMARY OF THE INVENTION

An object of the present invention is to provide a page turning apparatus for booklets, which is capable of turning the pages of a booklet, such as a passbook, which has a plurality of pages, one by one reliably even if the sheets of the passbook have different rigidities.

Another object of the present invention is to provide a page turning means capable of being used optimumly for turning the pages of booklets.

The first characteristics of the page turning apparatus according to the present invention reside in that the apparatus is provided with a booklet transfer means, a page turning means adapted to contact the free end of the booklet and turn a page thereof, and a means for pressing the free end of the booklet against the page turning means at the time of starting a page turning operation, the pressing means being formed so that the level of a pressing force thereof can be changed in accordance with the properties of the sheets of the booklet, i.e., when the page to be turned is changed from a page of a cover, which has high rigidity and surface smoothness, to a page of a leaf, the rigidity of which is lower than that of the cover, and vice versa.

The second characteristics of the present invention reside in that the means for turning a page of a booklet is disposed so as to be spaced to the left or right from the center line of the relative portion of a booklet transfer passage in the direction which is at right angles to the same transfer passage.

The third characteristics of the present invention reside in that the page turning means and a friction member thereof are disposed and shaped, respectively, in such a manner that a contact angle, which is an angle between the direction in which the force is applied from the page turning means to the paper to be turned and the direction parallel to the surface of the paper, becomes not higher than a predetermined level.

BRIEF DESCRIPTION OF THE DRAWINGS

FIGS. 32–38 illustrate the detailed construction of the page turning roller used in the present invention; wherein:

FIG. 32 is a graph showing the relation between the angle (contact angle), at which the force is applied to a plurality of sheets of one-end-bound paper toward the mentioned end thereof, and the deformation of the paper;

FIGS. 33–35 illustrate the condition of deformation of the paper in various regions in the graph of FIG. 32;

FIG. 36 is a construction diagram of a friction-separating roller formed so as to set the contact angle thereof within an arbitrary range of levels;

FIG. 37 shows a system for chamfering a page turning roller so that it has a predetermined shape; and FIG. 38 shows a concrete shape of a page turning roller.

DESCRIPTION OF THE PREFERRED EMBODIMENTS

Figure 1:
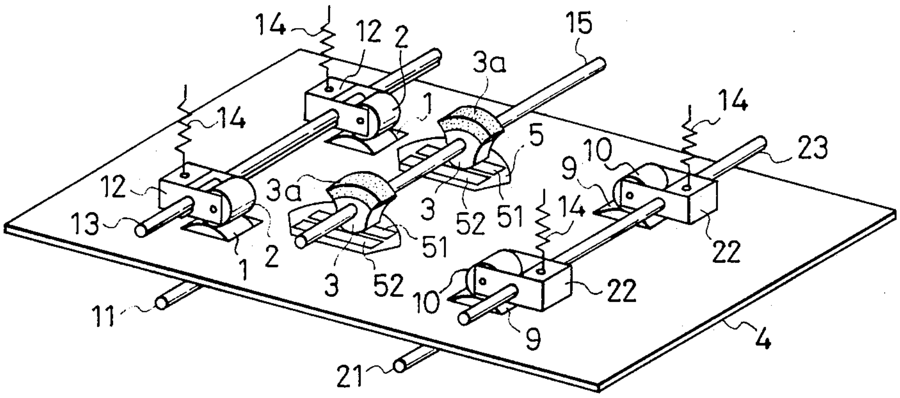
FIG. 1 is a schematic perspective view of a principal portion of a first embodiment of the present invention.
Figure 2:
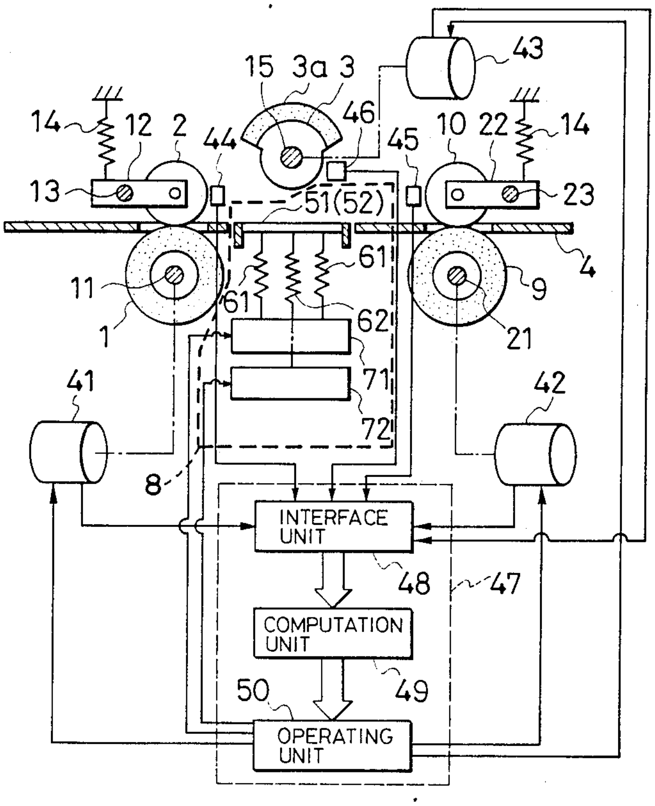
FIG. 2 is a side elevation of the embodiment of FIG. 1 including a driving control system.

FIG. 1 is a perspective view of a principal portion of an embodiment of the present invention, FIG. 2 a side elevation of the embodiment of FIG. 1, and FIGS. 3–10 operation diagrams. The first driving rollers 1 and first follower rollers 2 opposed thereto, and the second driving rollers 9 and second follower rollers 10 opposed thereto are disposed in vertically-opposed state on the upper and lower sides of and in the openings made in a base 4, to thereby form first and second transfer means. These first and second driving rollers 1, 9 consist of friction members composed of rubber, and they are mounted fixedly on first and second shafts 11, 21 on the lower side of the base 4 in this embodiment. These first and second shafts 11, 21 are supported rotatably on side walls (not shown) so that these shafts extend at right angles to the passbook transfer direction and in parallel with each other, the shafts 11, 21 being rotated by driving power sources 41, 42 consisting of DC servomotors. The first and second follower rollers 2, 10 are supported rotatably on first and second roller frames 12, 22, respectively. The first and second roller frames 12, 22 are supported pivotably on shafts 13, 23 which are provided on the side walls. These shafts 13, 23 are supported on the side walls (not shown) so that the shafts extend at right angles to the passbook transfer direction and in parallel with each other. These first and second roller frames 12, 22 are usually provided so as to keep the first and second follower rollers 2, 10 in press-contact with the first and second driving rollers 1, 9 on the upper surface of the base 4 by springs 14. When a cover 18c of or a leaf 18a in a passbook 18, which will be described later, is being turned, the first and second roller frames serve also as restricting means for holding a sewn portion 18h or a free end portion of the passbook 18. Each of the page turning rollers 3 as page turning means is cam-shaped, and the outer circumferential portion of a predetermined length of the page turning roller 3 consists of a friction member 3a of a high frictional resistance which is composed of rubber. These page turning rollers 3 are mounted fixedly on a page turning roller shaft 15 and adapted to be driven by a driving power source 43 consisting of a stepping motor. Each pressing means 8, which is disposed so as to be opposed to the relative page turning roller 3 via the base 4, consists of two pressing plates 51, 52 positioned in an opening which is made in the portion of the base 4 which is opposed to the relative page turning roller 3, compression springs 61, 62 joined to these pressing plates 51, 52, and pressing units 71, 72 joined to the springs. Namely, the opening made in the portion of the base 4 which is opposed to the relative page turning roller 3 is provided therein with the first pressing plate 51 for pressing up the passbook 18 toward the page turning roller shaft 15 when a leaf 18a in the passbook 18 is turned, and the second pressing plate 52 for pressing up the passbook 18 toward the page turning roller shaft 15 when a cover of the passbook 18 is turned. The first and second pressing plates 51, 52 are provided with the first and second pressing units 71, 72 via the first and second compression springs 61, 62.

Each of the first and second pressing units 71, 72 consists of a solenoid. As described above, owing to the operations of the first and second pressing units 71, 72, the first and second pressing plates 51, 52 are pressed up toward the page turning roller shaft 15.

In this embodiment, the distance between the point of application of the transfer force of a first driving roller 1 and the relative follower roller 2 and the point of application of the transfer force of the corresponding second driving roller 9 and the relative follower roller 10 is set shorter than the length, which corresponds to the distance between the sewn portion 18h and free end portion, of the passbook 18, and a page turning operation is carried out with the sewn portion 18h and free end portion of the passbook 18 pressed by the rollers. A modification of this embodiment may, of course, be made, in which a page turning operation is carried out with the free end portion of the passbook 18 not pressed by the rollers.

The sensors 44, 45 for detecting the passbook 18 are provided in the vicinity of the first and second follower rollers 2, 10, and these sensors are adapted to detect the passage of an end surface of the passbook 18 during the transfer thereof. A sensor 46 for detecting the rotational position of the page turning roller 3 is adapted to detect the rotational condition of this roll 3 during a page turning operation. A control means 47 is provided with an interface unit 48 for receiving as inputs signals of the results of detection from the sensors 44, 45, 46 and feedback signals from the driving power sources 41, 42, 43, a computation unit 49 adapted to receive an output signal from the interface unit 48 and compute the driving power of the driving power sources 41, 42, 43, and an operating unit 50 adapted to output a command signal for actuating the driving power sources 41, 42, 43. A detecting means (not shown) for determining whether the passbook is put in opened or closed state in the transfer passage is provided at the inlet side of the transfer passage.

An operation for turning a page of a leaf in a passbook carried out in the embodiment of FIGS. 1 and 2 will now be described with reference to FIGS. 3–6. When a passbook 18 is inserted from the inlet side of a transfer passage, a page turning command is generated from a central information processor (not shown). The driving power sources 41, 42 are then controlled on the basis of the signals from the sensors 44, 45, and the passbook 18 is sent to the position shown in FIG. 3, by the first driving and follower rollers 1, 2 and second driving and follower rollers 9, 10. During this time, the passbook 18 is stopped in an optimum position with a high positioning accuracy in accordance with the signals from the sensors 44, 45. It is then judged whether a cover turning operation or a leaf turning operation should be carried out, on the basis of a signal from the detecting means (not shown) for determining whether the passbook is inserted in opened or closed state in the transfer passage, to actuate one or both of the first and second pressing units 71, 72 in the pressing unit 8 in accordance with a signal from the operating unit 50 and thereby press the passbook 18 against the page turning rollers 3. (In this embodiment, the passbook 18 is inserted in opened state in the direction of an arrow A.) During this time, the second driving and follower rollers 9, 10, which are positioned in the vicinity of the bound portion of the passbook 18, work also as restricting means for the passbook 18 to prevent the passbook from moving in the transfer direction during a page turning operation and secure the rigidity of the paper other than the paper (the leaf 18a in this embodiment) being turned. When the leaf 18a is turned over as in this embodiment, the second pressing plates 52 are operated by the second pressing means 72 so that the second pressing plates 52 are positioned in a level lower than the base 4. When the passbook 18 reaches the position shown in FIG. 3, the page turning rollers 3 rotate from the position shown in FIG. 3 to the position shown in FIG. 4, in the direction of an arrow C in accordance with a command from the control means 47 to press down the passbook 18 and first pressing plates 51. The first pressing plates 51 receive reaction force from the first compression springs 61, so that the page turning rollers 3 generate a large frictional force with respect to the passbook 18. This causes the leaf 18a contacting the frictional members 3a to be largely bent as shown in FIG. 4.

Figure 4:
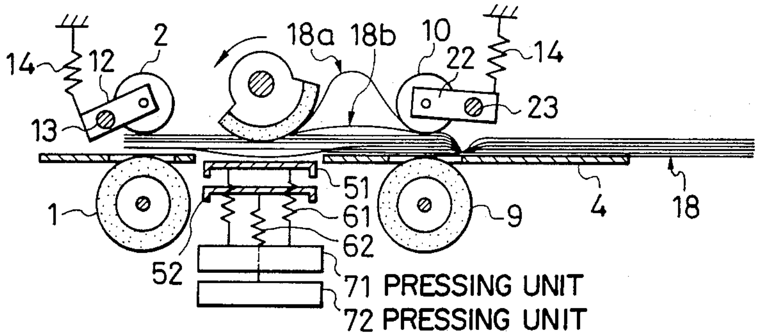

The page turning rollers 3 rotate as shown in FIG. 4, and the leaf 18a is bent largely as mentioned above. When the leaf 18a has passed a position in which the paper is held between the first driving rollers 1 and the first follower rollers 2 which serve also as pressing means, the second and lower leaves 18b cease to be bent, owing to the frictional force applied from the first driving and follower rollers 1, 2 thereto.

Figure 5:
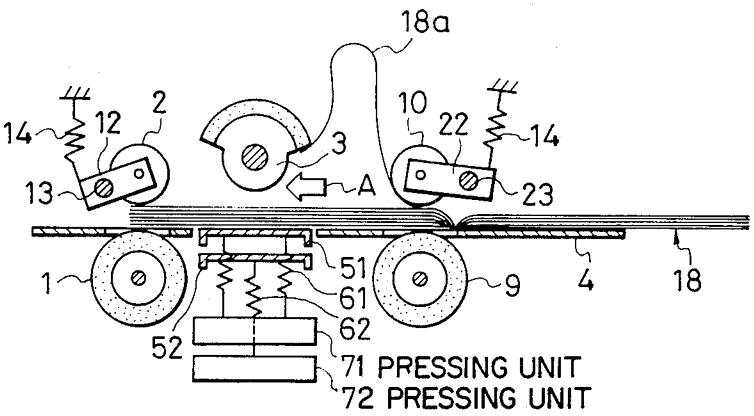

When the page turning rollers 3 have further been turned as shown in FIG. 5, the leaf 18a is turned more largely to the position shown in the same drawing. The page turning rollers 3 are stopped in this position, and the first and second driving rollers 1, 9 are rotated to transfer the passbook 18 in the direction of an arrow A. As the passbook 18 is thus transferred, the angle at which the leaf 18a is turned increases. When the passbook 18 has further been transferred, the leaf 18a separates from the page turning rollers 3. After the leaf 18a has separated from the rollers 3, the first and second driving rollers 1, 9 are stopped to complete the operation for turning the page of the leaf 18a in the passbook 18.

Figure 6:
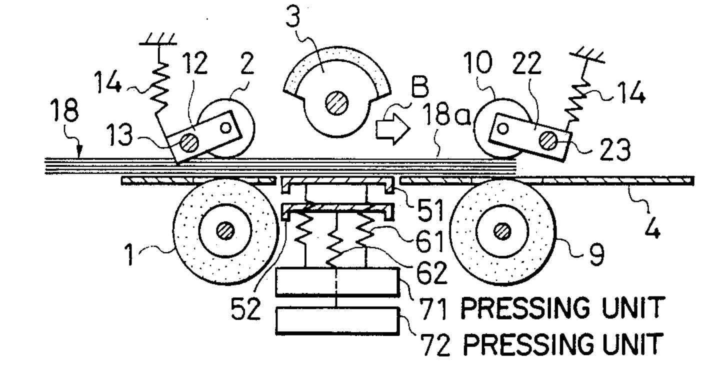

The passbook 18 in the condition shown in FIG. 6 is then transferred in the direction of an arrow B so that the portion of the passbook 8 which is in the vicinity of the bound portion of the leaf being turned are held by the second driving and follower rollers 9, 10. The page turning rollers 3 are then turned again. Consequently, the leaf 18a contacting the frictional members 3a of the page turning rollers 3 is bent largely as shown in FIG. 4. The above-described operations are thereafter carried out repeatedly in accordance with a page turning command signal to open a desired page of the leaf 18a.

While the page turning rollers 3 are turned in the above-described page turning operation, a control force is applied to the second follower rollers 10.

An operation for turning a cover 18c of the passbook 18 will now be described with reference to FIGS. 7–10.

Figure 7:
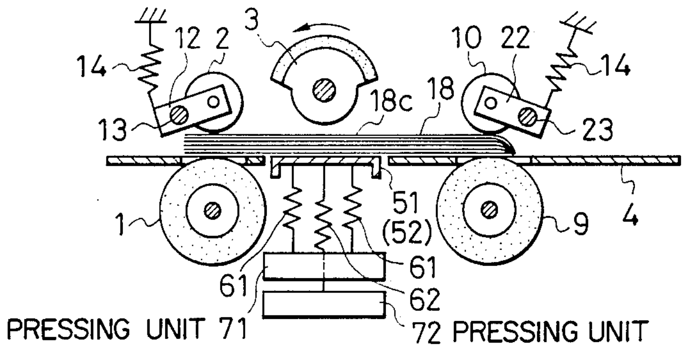
Figure 8:
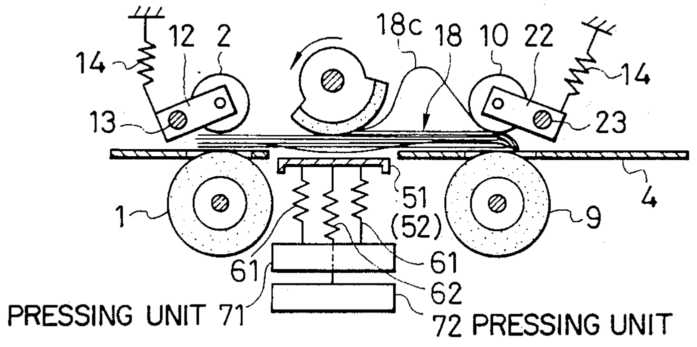

The passbook 18 is sent to the position shown in FIG. 7 by the first driving and follower rollers 1, 2 and second driving and follower rollers 9, 10. (In this example, the passbook 18 is inserted in closed state into the transfer passage.) In this example, the second driving and follower rollers 9, 10, which are positioned in the vicinity of the bound portion of the passbook 18, work as restricting means for the passbook 18, and prevent the passbook 18 from moving in the transfer direction thereof during a cover turning operation. When the cover 18c, the rigidity of which is higher than that of the leaf 18a, is turned as in this example, the first and second pressing plates 51, 52 are operated so as to raise the passbook 18 toward the page turning roller shaft 15 by the first and second pressing units 71, 72. The page turning rollers 3 is turned from the position shown in FIG. 7 to the position shown in FIG. 8, to press down the passbook 18 and first and second pressing plates 51, 52. The first and second pressing plates 51, 52 receive reaction force from the first and second compression springs 61, 62, so that a frictional force larger than that in the operation for turning a page of the leaf 18a occurs in the page turning rollers 3 with respect to the passbook 18. As a result, the cover 18c which the members 3a having a large frictional force contact is bent largely as shown in FIG. 8. The page turning rollers 3 are turned as shown in FIG. 8, and the cover 18c is bent largely as mentioned above.

Figure 9:
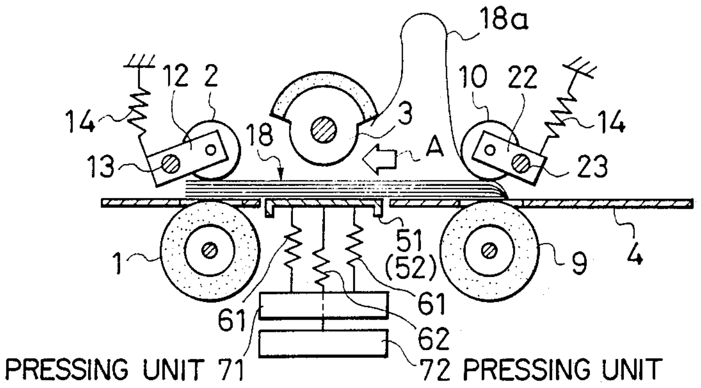

When the page turning rollers 3 have further been turned as shown in FIG. 9, the cover 18c is turned more largely to be positioned as shown in the same drawing.

Figure 10:
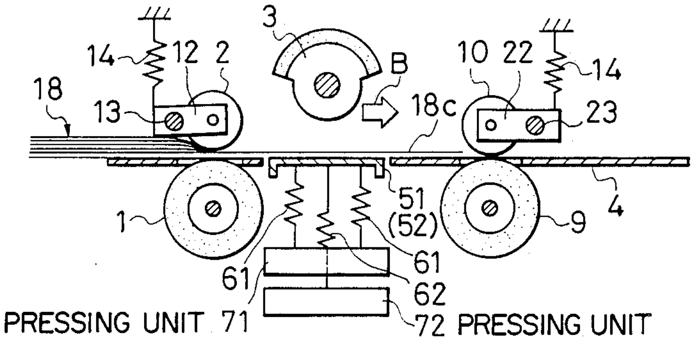

The page turning rollers 3 are then stopped, and the first driving rollers 1 are rotated to transfer the passbook 18 in the direction of an arrow A. As the passbook 18 is transferred, the angle at which the cover 18c is turned increases. When the passbook 18 has further been transferred, the cover 18c thereof separates from the page turning rollers 3 as shown in FIG. 10. After the cover 18c has separated from the page turning rollers 3, the first and second driving rollers 1, 9 are stopped to complete the operation for turning a page of the cover 18c of the passbook 18.

Figure 3:
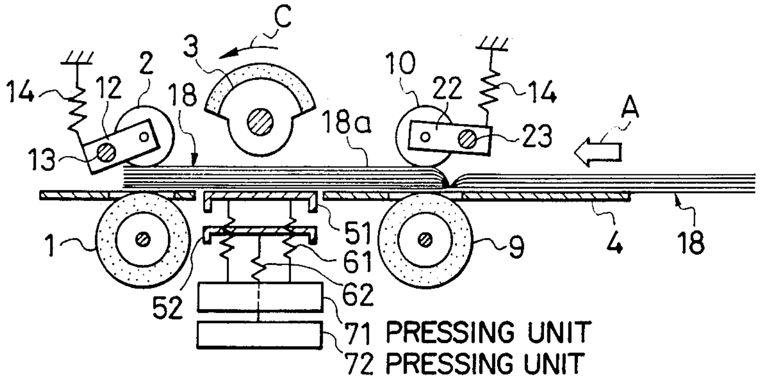
FIGS. 3–10 illustrate a page turning operation of the embodiment shown in FIGS. 1 and 2.

The passbook 18 in the condition shown in FIG. 6 is then transferred in the direction of an arrow B so that the portion of the passbook 18 which is in the vicinity of the bound portion thereof is held by the second driving and follower rollers 9, 10. The second pressing unit 72 is then operated to press down the second pressing plates 52 as shown in FIG. 3. The page turning rollers 3 are then turned again. An operation for turning a page of a leaf 18a in the passbook 18 is thereafter carried out in accordance with a page turning command.

As described, the turning of pages of sheets of paper, which have different bending rigidities, such as a cover and a leaf of a passbook can be done reliably owing to the structure shown in FIGS. 1 and 2.

The above-described page turning operation is carried out by controlling the page turning rollers 3 and first and second driving rollers 1, 9 in accordance with a control signal generated in the control means 47 on the basis of a command signal from the central information processor and signals from the sensors 44, 45, 46.

Figure 11:
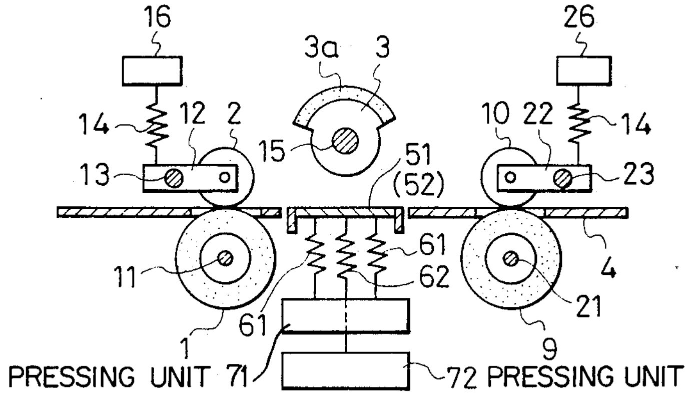
FIG. 11 is a schematic side elevation of another embodiment of the present invention.

FIG. 11 is a schematic side elevation of a principal portion of another embodiment of the present invention.

This embodiment is made by providing first and second lift mechanisms 16, 26 on the first and second roller frames 12, 22, which support the first and second follower rollers 2, 10, in the embodiment of FIGS. 1 and 2. These first and second lift mechanisms 16, 26 consist of solenoids, which are operated in accordance with the rigidity of the paper to be turned, to thereby regulate the loads on the first and second follower rollers 2, 10. This enables the pages of sheets of paper having different bending rigidities to be turned more reliably.

Figure 12:
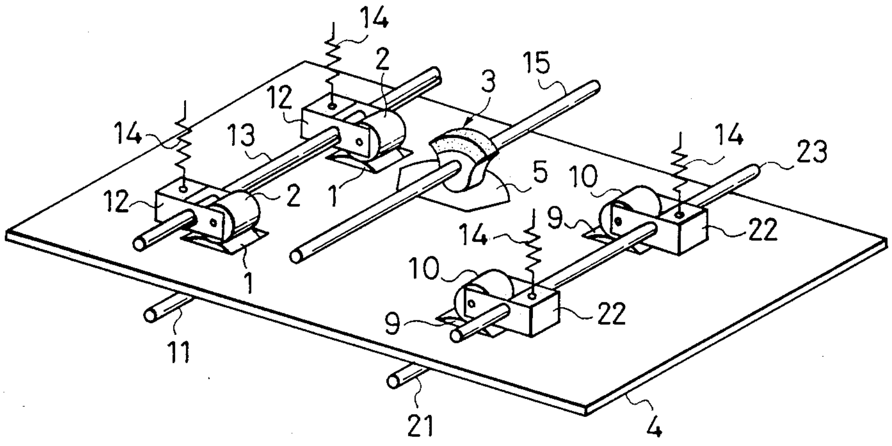
FIG. 12 is a schematic perspective view of a principal portion of still another embodiment of the present invention.
Figure 13:
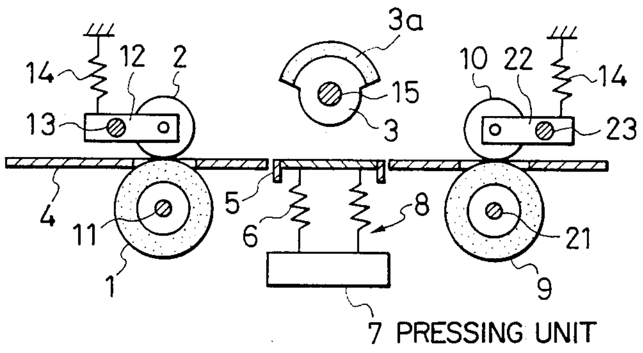
FIG. 13 is a side elevation of the embodiment of FIG. 12.
Figure 14:
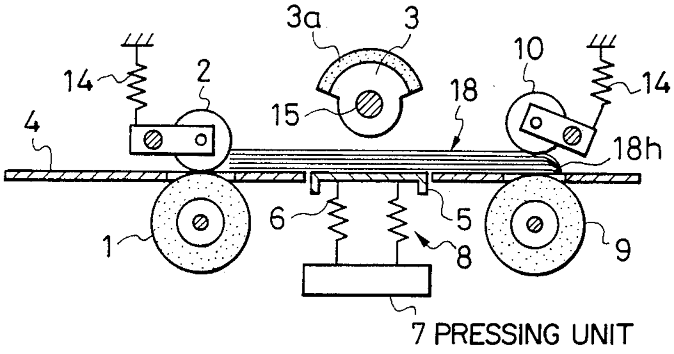
FIGS. 14–18 illustrate a page turning operation of the embodiment shown in FIGS. 12 and 13.

FIGS. 12–20 illustrate still another embodiment of the present invention, wherein FIG. 12 is a perspective view of a principal portion; FIG. 13 is a side elevation of what is shown in FIG. 12; and FIGS. 14–19 illustrate the operation of this portion. Referring to these drawings, the same parts as shown in FIGS. 1–10 are designated by the same reference numerals, and the detailed descriptions thereof are omitted.

A page turning roller 3 as a page turning means is mounted fixedly on the portion of a page turning roller shaft 15 which is spaced to left or right from the center line of a passage, through which a passbook 18 is transferred, in the direction which is at right angles to the passbook transfer direction. A pressing plate 5 constituting a pressing means 8 is provided in an opening made in the portion of a base 4 which is opposed to the page turning roller 3. This pressing plate 5 is positioned so that a frictional force is applied sufficiently between a frictional member 3a of the page turning roller 3 and a passbook (not shown). In this embodiment, the distance between the point of application of transfer force of the first driving and follower rollers 1, 2 and that of transfer force of the second driving and follower rollers 9, 10 is set shorter than the distance between a sewn portion 18h of the passbook 18 and the free end thereof so that the passbook is always pressed by at least one of the first and second driving rollers 1, 9 during a passbook transferring operation. During an operation for turning a page of the passbook 18, the bound portion 18h of the passbook 18 is held by the second driving and follower rollers 9, 10, and the free end thereof is not held by the first driving and follower rollers 1, 2.

A pressing plate 5 in a pressing means 8 is adapted to be operated so as to press up the passbook toward the page turning roller shaft 15 by a pressing unit 7 consisting of a compression spring 6 and a solenoid.

Figure 15:
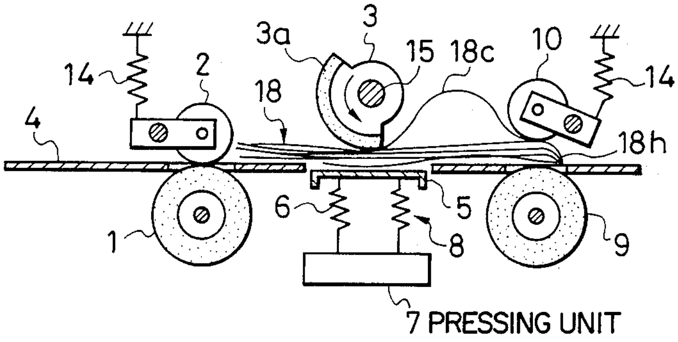
Figure 16:
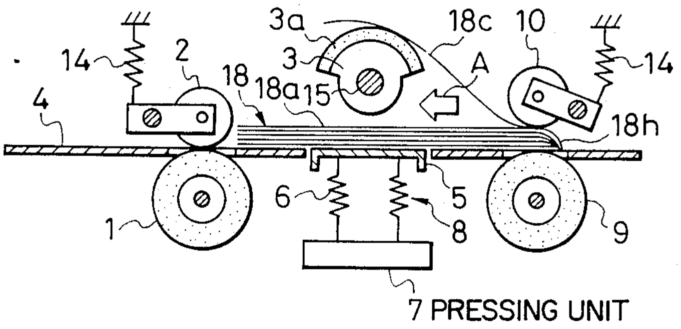
Figure 17:
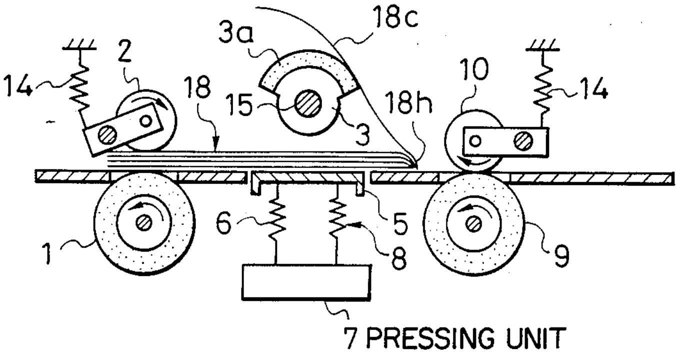
Figure 18:
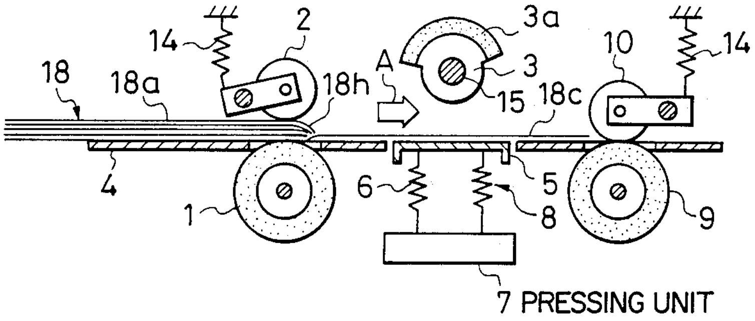
Figure 19:
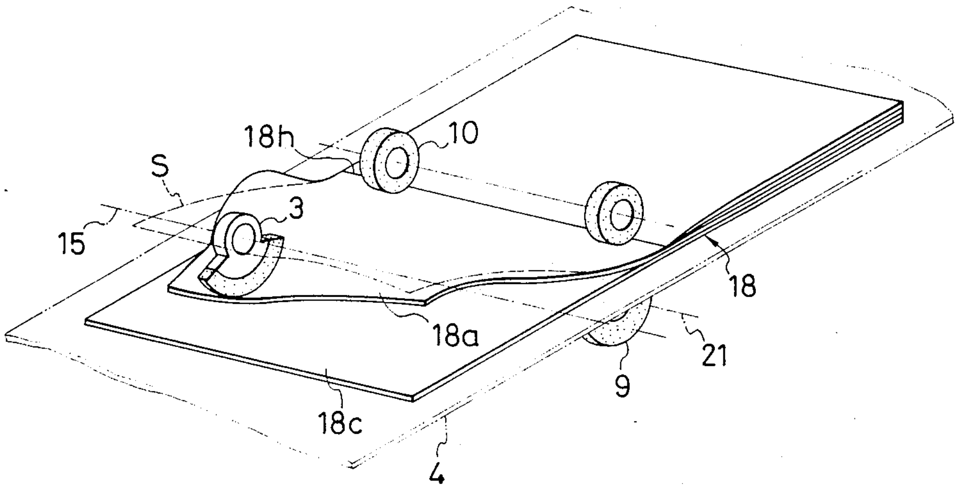
FIG. 19 shows the condition of deformation of paper during a page turning operation of the embodiment shown in FIGS. 12 and 13.

An operation for turning a page of the passbook in the embodiment of FIGS. 12 and 13 will now be described with reference to mainly FIGS. 14–19. The passbook 18 is sent to the position shown in FIG. 14 by the first driving and follower rollers 1, 2 and second driving and follower rollers 9, 10. In this embodiment, the passbook 18 is transferred in closed state. During this operation, the sewn portion 18h of the passbook 18 is held by the second driving and follower rollers 9, 10 so as to prevent the passbook 18 from being moved in the transfer direction thereof while a page of the passbook 18 is turned, and retain the rigidity of the paper other than the paper (a cover 18c in this embodiment) being turned. The page turning roller 3 is turned from the position shown in FIG. 14 to the position shown in FIG. 15 to press down the passbook 18 and pressing plate 5. The pressing plate 5 receives a reaction force from a spring 6, so that the page turning roller 3 generates a large frictional force with respect to the passbook 18. Consequently, the cover 18c contacting the frictional member 3a is bent largely as shown in FIG. 15. During this time, the cover 18c of the passbook 18 contacts one of the two corner portions of the opened free end, which is on the opposite side of the sewn portion 18h, of the passbook 18 since the page turning roller 3 is provided on the portion of the shaft 15 which is spaced to left or right from the intermediate portion thereof. Accordingly, the cover 18c is deformed as shown in FIG. 19 which will be described later. (FIG. 19 illustrates the turning of a leaf 18a, in which the cover 18 can also be deformed in the same manner.) When the page turning roller 3 has made one full turn, it is positioned between the cover 18c and paper to be turned subsequently (a leaf 18a in this embodiment) as shown in FIG. 16. The page turning roller 3 is then stopped, and the first and second driving rollers 1, 9 are rotated to transfer the passbook 8 in the direction of an arrow A. As the passbook 18 is transferred, the angle at which the cover 18c engaged with the page turning roller 3 is turned increases as shown in FIG. 17. When the passbook 18 has further been transferred, the cover 18c of the passbook 18 separates from the page turning roller 3 as shown in FIG. 18. After the cover has separated from the roller 3, the first and second driving rollers 1, 9 are stopped to complete the turning of a page of the cover 18c of the passbook 18.

In order to turn a page of the leaf 18a in the passbook 18, the first and second driving rollers 1, 9 are rotated with the other parts in the condition shown in FIG. 18, to transfer the passbook 18 in the direction of an arrow A so that the sewn portion 18h of the passbook 18 is held by the second driving and follower rollers 9, 10. The page turning roller 3 is then turned again. As a result, one of the two corner portions of the leaf 18a contacting the frictional member 3a of the page turning roller 3 is bent largely as shown in FIG. 19. When the page turning roller 3 has made one full turn, it is positioned between the turned leaf 18a and a subsequent leaf. The first and second driving rollers 1, 9 and page turning roller 3 are then turned in the same manner as in the operation for turning the cover 18c, which is illustrated in FIGS. 14–18, to carry out the page turning of the leaf 18a in the passbook 18. The above-described operations are then carried out repeatedly in accordance with page turning command signals to turn the desired pages.

Figure 20:
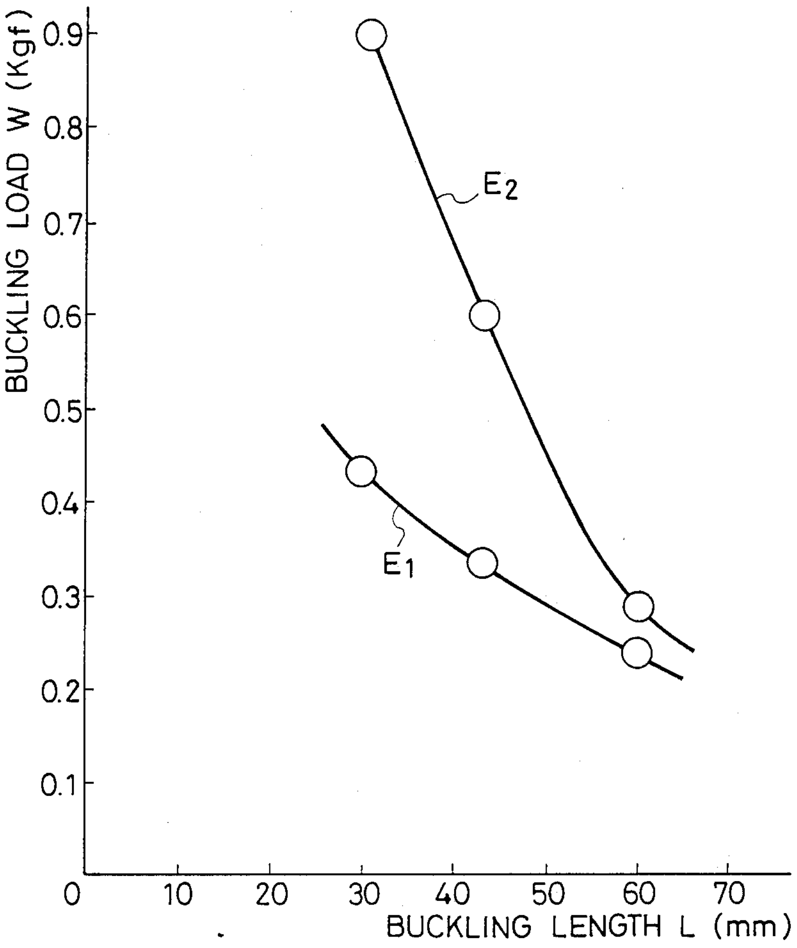
FIG. 20 is a graph showing the relation between the buckling load and buckling length of the paper in a passbook inserted in the embodiment of FIGS. 12 and 13 and a conventional apparatus of this kind.

FIG. 19 shows the leaf 18a, which is being turned by the page turning roller 3, of the passbook 18. (The turning of the cover 18c is done in the same manner.) As may be understood from this drawing, the page turning roller 3 is mounted on the portion of the shaft 15 which is spaced to left or right from the center line of the transfer passage for the passbook 18, which shaft 15 is parallel to the second shaft 21 on which the second driving roller 9 is mounted fixedly and the shaft supporting the second follower roller 10 thereon. Therefore, mainly the portion of the cover 18c or leaf 18a (leaf 18a in this embodiment) in turning motion which is on the side of the page turning roller 3 is deformed, so that the quantities of deformation of the left and right corner portions of the leaf 18a become different. Namely, the leaf 18a is not deformed in parallel with the bound portion 18a of the passbook 18a. Accordingly, the degree of deformation of this turned leaf 18a is lower than that of a leaf 18a in which the quantities of deformation of both corner portions are equal, i.e. a leaf 18a the free end portion of which is deformed in parallel with the bound portion 18h thereof (shown by a broken line S in FIG. 19). This enables the load resistance of the leaf 18a turned in the embodiment of FIGS. 12 and 13 to be reduced, and the rigidity thereof to increase. This means that the operations for turning pages of even a passbook 18 having a cover 18c and leaves 18a, which have different rigidities, or a cover 18c coated with a resin of a high surface smoothness can be carried out with a high reliability. Since the quantity of deformation of the cover 18c and leaves 18a is small, the cover and leaves can easily recover their shapes after they have been turned. FIG. 20 is a graph showing the relation between the distance L (i.e. The buckling length) between the opposed portions of the second driving and follower rollers 9, 10 and the page turning roller shaft 15 and the buckling load on a leaf 18a in the passbook 18. The lateral axis of this graph represents the distance L (mm), and the longitudinal axis thereof the buckling load W (kgf). Referring to the drawing, a curve $E_2$ represents the mentioned relation in the case where the leaf 18a of the passbook 18 is buckled in parallel with the sewn portion 18h thereof, and a curve $E_1$ similar relation in the case where the leaf 18a in the passbook 18 is buckled by the page turning roller 3 disposed on the side of one of the two corner portions of the leaf 18a. The graph shows that $E_1 < E_2$. It indicates that a page turning operation should preferably be carried out with a low buckling load W which constitutes a load resistance.

Figure 21:
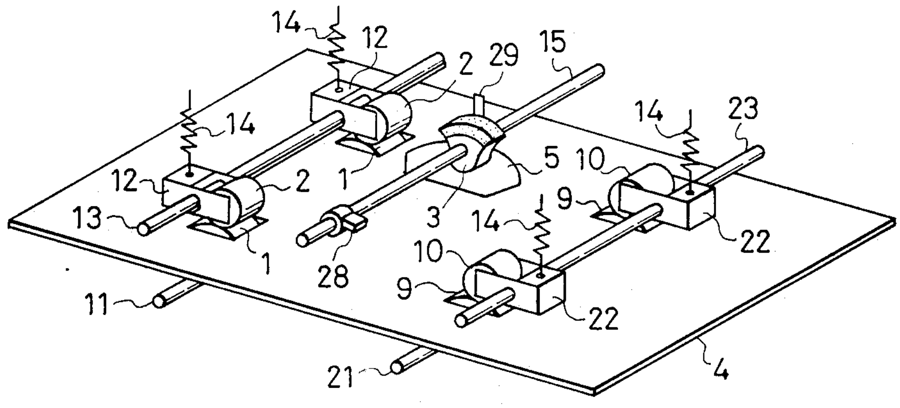
FIG. 21 is a schematic perspective view of a principal portion of a further embodiment of the present invention.
Figure 22:
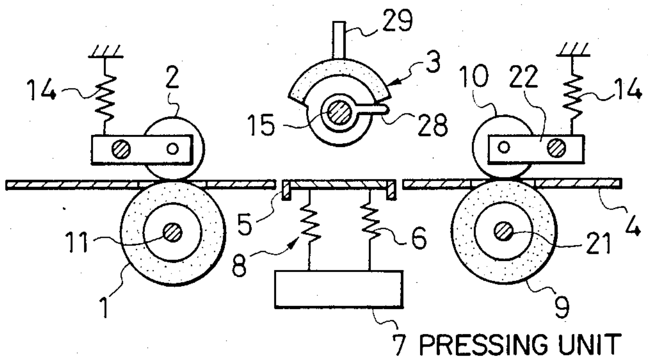
FIG. 22 is a side elevation of the embodiment of FIG. 21.
Figure 23:
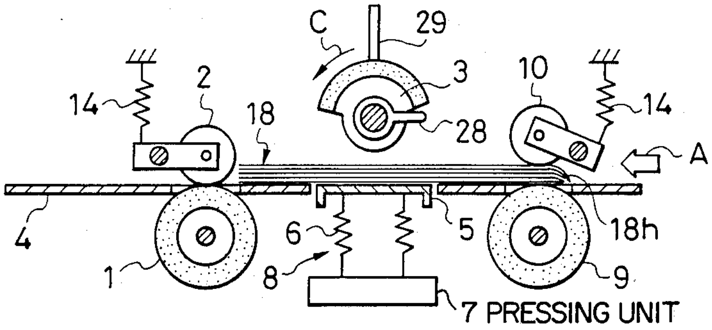
FIGS. 23–27 illustrate a page turning operation of the embodiment shown in FIGS. 21 and 22.

FIGS. 21–28 illustrate a further embodiment of the present invention, wherein FIG. 21 is a perspective view of a principal portion of the embodiment; FIG. 22 is a side elevation of what is shown in FIG. 21; and FIGS. 23–28 illustrate the operation of the embodiment. Referring to these drawings, the same parts as shown in FIGS. 12–19 are designated by the same reference numerals, and the detailed description thereof is omitted.

A page turning roller 3 as a page turning means is mounted fixedly on the portion of a page turning roller shaft 15 which is spaced to left or right from the center line of a transfer passage for a passbook 18 in the direction which is at right angles to the direction in which the passbook 18 is transferred. A picker 28 as a page turning member is mounted fixedly on the portion of the shaft 15 which is spaced from the intermediate portion thereof to the opposite side of the page turning roller 3, in such a manner that the passbook contacting phase of the picker 28 is delayed with respect to that of the page turning roller 3. The shaft 15 is further provided with an elastic member 29 mounted fixedly on the portion thereof which is by the page turning roller 3 and on the opposite side of the picker 28. A pressing plate 5 is provided in an opening made in the portion of a guide plate 4 which is opposed to the page turning roller 3. This pressing plate 5 is positioned so that a frictional force is applied sufficiently between a frictional member 3*a*, which is provided on the page turning roller 3, and which consists of a material of a high frictional resistance, and a passbook (not shown). The distance between the point of application of the transfer force of the first driving and follower rollers 1, 2 and that of the second driving and follower rollers 9, 10 is set shorter than the distance between a bound portion 18*h* of a passbook 18 and the free end thereof, i.e. The free end of a cover 18*c* and a leaf 18*a*. During the turning of a page of the passbook 18, the sewn portion 18*h* of the passbook is held by the second driving and follower rollers 9, 10, and the free end portion of the passbook 18 is not by the second driving and follower rollers 1, 2.

A pressing plate 5 in a pressing means 8 is adapted to press up the passbook 18 toward the page turning roller shaft 15 by a pressing unit 7 consisting of a compression spring 6 and a solenoid.

Figure 24:
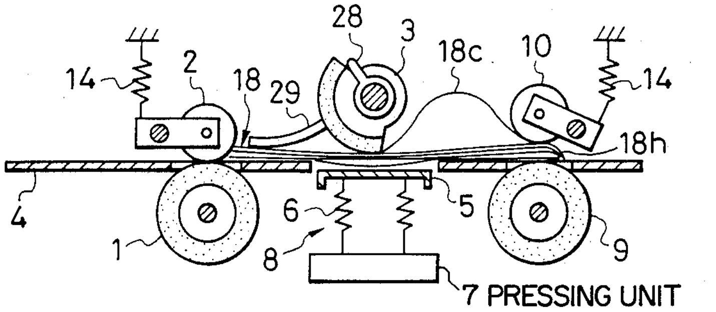
Figure 25:
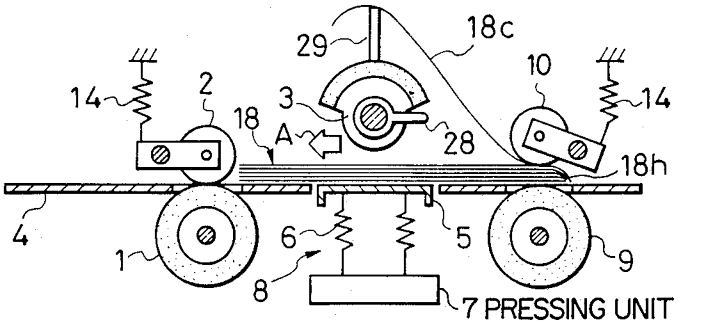
Figure 26:
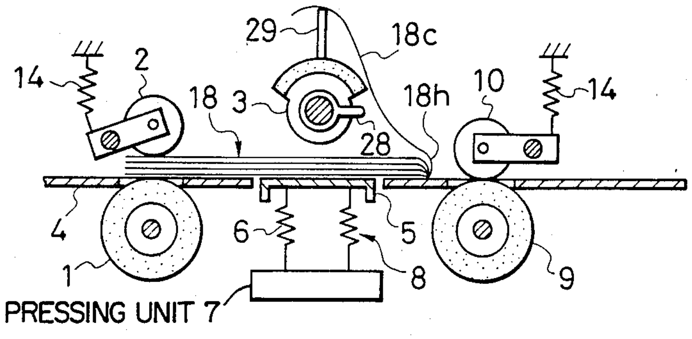

An operation for turning a page of the passbook in the embodiment of FIGS. 21 and 22 will now be described with reference to mainly FIGS. 23–28. The passbook 18 is sent to the position shown in FIG. 23, by the first driving and follower rollers 1, 2 and second driving and follower rollers 9, 10. (In this embodiment, the passbook 18 is inserted in closed state in the direction of an arrow A.) During this time, the sewn portion 18*h* of the passbook 18 is held by the second driving and follower rollers 9, 10 while it is turned, so as to prevent the passbook 18 from being moved in the transfer direction, and secure the rigidity of the paper other than the paper (a cover 18*c* in this embodiment) being turned. The page turning roller 3 is turned from the position shown in FIG. 23 to the position shown in FIG. 24, to press down the passbook 18 and a pressing plate 5. The pressing plate 5 receives a reaction force from a spring 6, so that the page turning roller 3 generates a large frictional force with respect to the passbook 18, the cover 18*c* which contacts the frictional member 3*a* being bent largely as shown in FIG. 24. The elastic member 29 is also turned with this page turning roller 3. This elastic member 29 holds a leaf 18*a*, which is paper other than the cover 18*c* of the passbook 18, by its own elastic force to carry out an operation for turning the cover 18*c*, more reliably. During this page turning operation, the page turning roller 3 contacts one of the two corner portions of the free open end, which is on the opposite side of the sewn portion 18*h*, of the cover 18*c* of the passbook 18 since the roller 3 is provided on the portion of the shaft 15 which is spaced to left or right from the intermediate portion thereof. Consequently, the cover 18*c* is deformed as shown in FIG. 28 which will be described later (Although FIG. 28 illustrates the turning of a leaf 18*a*, the cover 18*c* is also deformed in the same manner.). Owing to the deformation of one corner portion of the cover 18*c*, the same portion is buckled, and the other corner portion is not buckled but deformed vertically, so that a gap occurs between the latter corner portion and the leaf 18*a*. At this time, a picker 28, which has turned thereto in delayed phase with respect to the page turning roller 3, enters a space between the cover 18*c* and leaf 18*a*. When the shaft 15 is then further turned, i.e., when the page turning roller 3, elastic member 29 and picker 28 which is provided fixedly in delayed phase on the shaft 15 are further turned, the page turning roller enters the space under the cover 18*c*. When the page turning roller 3 has then made one full turn, it is positioned as shown in FIG. 25 in the space between the cover 18*c* and paper (a leaf 18*a* in this embodiment) to be subsequently turned. The page turning roller 3 is then stopped, and the first and second driving rollers 1, 9 are rotated to transfer the passbook 18 in the direction of an arrow A. As the passbook 18 is transferred, the angle at which the cover 18*c* engaged with the page turning roller 3 and elastic member 29 is turned increases as shown in FIG. 26. When the passbook 18 is further transferred, the cover 18*c* of the passbook 18 separates from the page turning roller 3 and elastic member 29. After the cover 18*c* has separated from the roller 3 and member 29, the first and second driving rollers 1, 9 are stopped to complete the turning of the cover 18*c* of the passbook 18.

Figure 27:
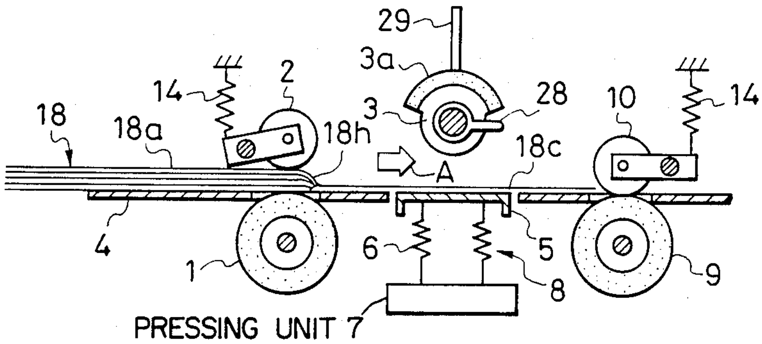
Figure 28:
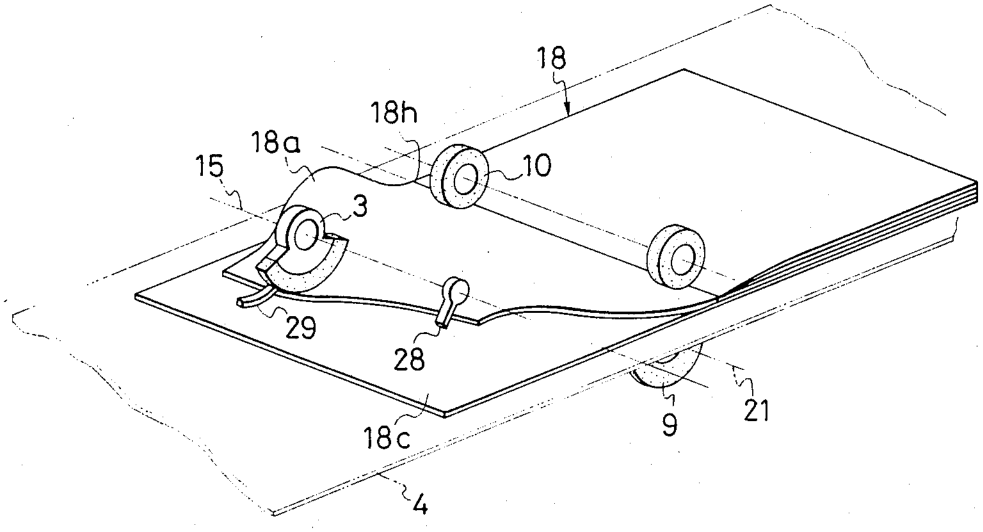
FIG. 28 shows the condition of deformation of paper during a page turning operation of the embodiment of FIGS. 21 and 22.

In order to turn a leaf 18*a* in the passbook 18, the first and second driving rollers 1, 9 in the condition shown in FIG. 27 are rotated to transfer the passbook 18 in the direction of an arrow B and hold the sewn portion 18*h* of the passbook 18 by the second driving and follower rollers 9, 10. The shaft 15 is then turned again to turn the page turning roller 3, picker 28, and elastic member 29. As a result, one of the corner portions, which contacts the frictional member 3*a* of the page turning roller 3, is bent largely as shown in FIG. 28. When the page turning roller 3 has made one full turn, it is positioned between the turned leaf 18*a* and a subsequent leaf, and the leaf 18*a* engages the elastic member 29.

The first and second driving rollers 1, 2, page turning roller 3, picker 28 and elastic member 29 are thereafter turned in the same manner as in the operation for turning the cover 18*c* shown in FIGS. 23–27, to carry out the turning of a page of the leaf 18*a* in the passbook 18. The above-described operations are thereafter carried out repeatedly in accordance with a page turning command signal to open a desired page of the passbook 18.

FIG. 28 shows the condition of the leaf 18*a*, which is being turned by the page turning roller 3, of the passbook 18. (The turning of the cover 18*c* is also done in the same manner as shown in this drawing.) As may be understood from this drawing, the page turning roller 3 is mounted on the portion of the shaft 15 which is spaced to left or right from the center line of a passbook transfer passage, which shaft 15 is parallel to the second shaft 21 on which the second driving rollers 9 are mounted fixedly and the shaft on which the second follower rollers 10 are supported, and the picker 28 is provided on the other side of the shaft 15. Accordingly, the quantities of deformation of both corner portions being turned of the cover 18c or leaf 18a (leaf 18a in this embodiment) become different. Namely, the leaf 18a is not deformed in parallel with the sewn portion 18h thereof. Therefore, the load resistance of the leaf 18a and the rigidity thereof become smaller and higher, respectively, than those of the leaf 18a which is turned with both corner portions thereof deformed equally, i.e. The leaf 18a which is deformed in parallel with the sewn portion 18h of the passbook 18 (a broken line S is not shown in FIG. 28, but it is same line as shown in FIG. 19). This means that the operations for turning pages of even a passbook 18 having a cover 18c and leaves 18a which have different rigidities, or a cover 18c coated with a resin of a high surface smoothness can be carried out with a high reliability.

When the paper which is as thick as around 250 μm like the cover 18c of the passbook 18 is subjected to a page turning operation by turning the page turning roller 3 in the direction of an arrow C in a page turning apparatus like the apparatus of the above-described embodiment provided with the picker 28 and elastic member 29, it is deformed largely by the page turning roller 3 and turned by the picker 28. When the paper which is as thin as around 90 μm like the leaf 18a in the passbook 18 is subjected to a similar page turning operation, the elastic member 29 turned with the page turning roller 3 is deformed largely, and the paper is turned forcibly by the elastic force of the member 29 as the movement of the unused sheets of paper, which are under the paper being turned, is suppressed.

Figure 29:
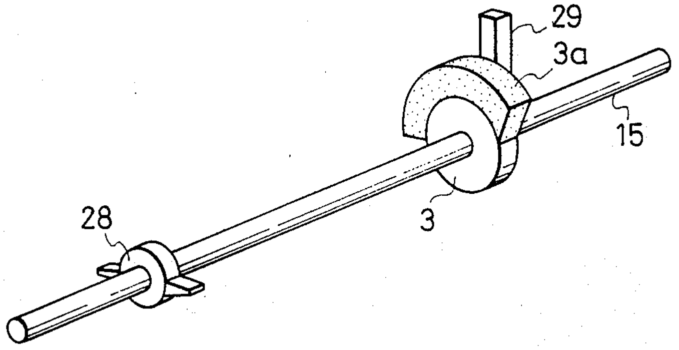
FIG. 29 is a perspective view of another example of a part, which includes a page turning roller, of the embodiment of FIGS. 21 and 22.

FIG. 29 illustrates another example of a combination of the page turning roller 3 and picker 28 in the present invention. The example of FIG. 29 is formed by providing the shaft 15 with a plurality of pickers 28 so that the turning phases of the pickers 28 differ from that of the page turning roller 3. In this arrangement, the page turning direction becomes unlimited, so that a page turning operation can be carried out in both the forward and backward directions.

In these embodiments, page turning apparatuses having an elastic member 29 by the page turning roller are described. Even if the elastic member 29 is omitted, a page turning operation can be carried out with a high reliability by the page turning roller 3 and picker 28.

Figure 30:
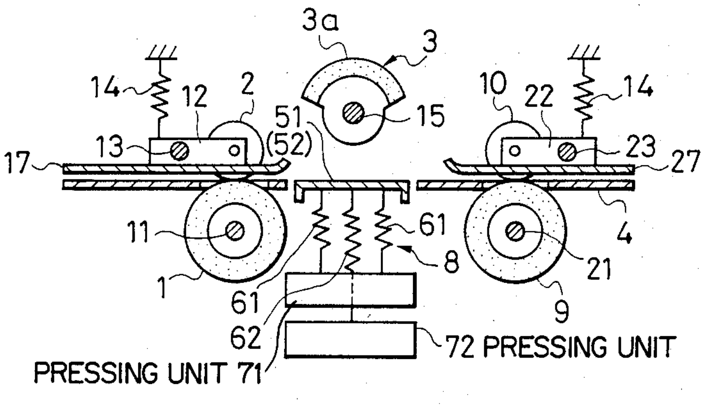
FIG. 30 is a schematic perspective view of a principal portion of a further embodiment of the present invention.
Figure 31:
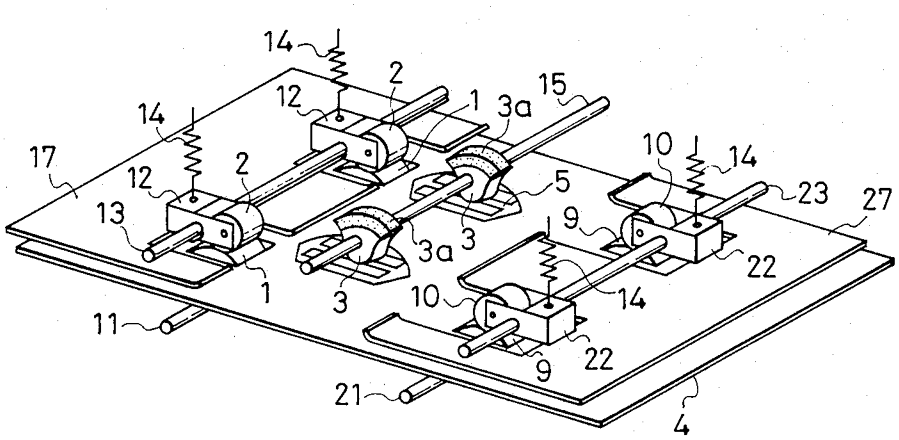
FIG. 31 is a side elevation of the embodiment of FIG. 30.

FIGS. 30 and 31 illustrate a further embodiment of the present invention, wherein FIG. 30 is a schematic perspective view of a principal portion; and FIG. 31 is a side elevation of what is shown in FIG. 30.

This embodiment is provided with first and second guide plates 17, 27 on the portions of the passbook transfer surface of a base 4 which are in the vicinity of the first and second follower rollers 2, 10, respectively.

These first and second guide plates 17, 27 work so that a passbook can be inserted smoothly between the first driving and follower rollers 1, 2 and between the second driving and follower rollers 9, 10 when the passbook is transferred by the first and second driving rollers 1, 9. These guide plates 17, 27 also work so as to restrict deforming the paper of the swen portion of the passbook while a page turning operation is carried out by the page turning roller 3.

The embodiment of FIGS. 30 and 31 is made by adding the first and second guide plates 17, 27 to the embodiment of FIGS. 1 and 2. The guide plates 17, 27 may, of course, be provided in the same manner in the other embodiments.

FIGS. 32–38 illustrate the optimum shape and mounting position of the page turning roller used in the page turning apparatus according to the present invention. In order that a plurality of sheets of paper (cover and leaves in case of a passbook) are separated and turned one by one from the upper side reliably with one end of all the sheets of paper held together in the same manner as that of the paper in a passbook page turning operation, it is recommendable to determine the shape and mounting position of the page turning roller so that a contact angle, an angle between the direction in which the force is applied from the page turning roller to the sheets of paper and the direction parallel to the plane of the paper is within a predetermined range.

Figure 32:
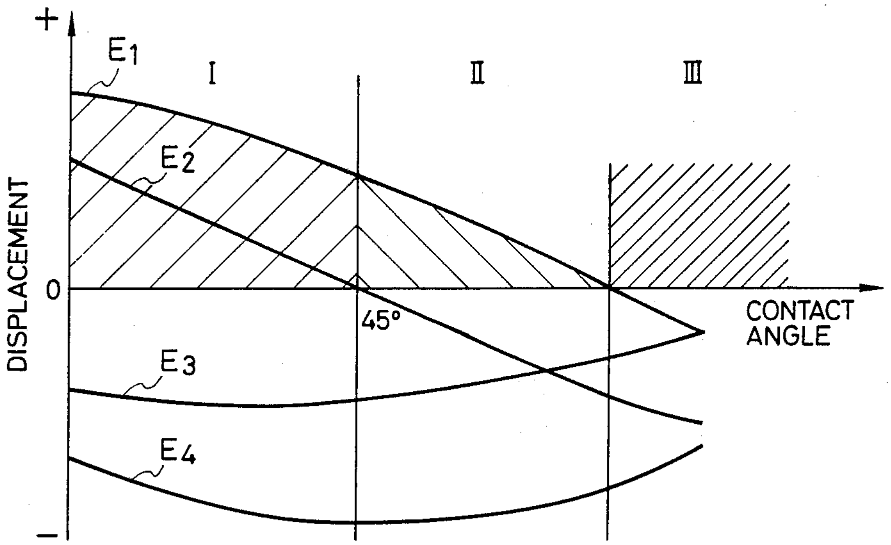

Before describing the optimum shape and mounting position of a page turning roller, the principle of separating a plurality of sheets of paper one by one by a frictional separating roller like a page turning roller with one end of each of the paper held together in the same manner as that of each paper in a passbook will now be described with reference to FIGS. 32–35. FIG. 32–35 show the results of determination by a Finite Element Method of an angle (which will hereinafter be referred to as a contact angle) at which the force is applied to a plurality of sheets of one-end-held paper toward such end portion thereof, and the quantities of displacement of the uppermost paper and the lower sheets of paper at a point $S_2$ which is several millimeters away from the free end of the paper toward the mentioned bound end portion thereof, and a point $S_1$ which is several ten millimeters away from the free end of the paper toward the same bound end portion thereof. The lateral axis of FIG. 32 represents the contact angle $\theta$, and the longitudinal axis thereof the quantity of displacement of the paper. The quantity of displacement referred to above means the quantity of displacement of the uppermost paper (first paper) $P_1$ in the direction of normal, and the displacement of the uppermost paper in the anti-laminating direction (upward direction in FIG. 32) and the displacement thereof in the direction (downward direction in FIG. 32) from the uppermost paper to the paper lower than the uppermost paper (second and lower paper) are determined as the positive displacement and negative displacement, respectively. Referring to the drawing, a curve $E_1$ shows the quantity of displacement of the uppermost (first) paper 1 at the point $S_1$, a curve $E_2$ the quantity of displacement of the first paper at the point $S_2$, a curve $E_3$ the quantity of displacement of paper lower than the uppermost paper (second and lower paper) at the point $S_1$, and a curve $E_4$ the quantity of displacement of the second and lower paper at the point $S_2$.

Figure 33:
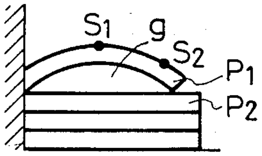
Figure 34:
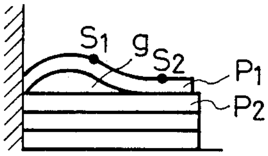
Figure 35:
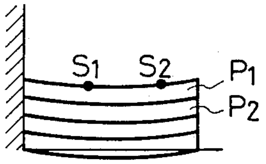

FIGS. 33, 34 and 35 show the displacement of the first and second paper $P_1$, $P_2$ in the regions I, II and III in FIG. 32. In the region I, the first and second sheets of paper $P_1$, $P_2$ are separated largely to form a gap g as shown in FIG. 33. In the region II, the first and second paper $P_1$, $P_2$ are separated considerably but not so largely as in the region I to form a gap g as shown in FIG. 34. However, in the region III, the second paper shows its negative displacement, i.e., moves down as shown in FIG. 35, so that no gaps occur in contrast to the case of the paper in the regions I and II. Therefore, in order to separate the uppermost paper from laminated sheets of paper, it is preferable that the conditions in the region I be met. These conditions are to set the contact angle $\theta$ to not more than about 45°. Namely, analysis showed that the preferable conditions for separating the uppermost paper from laminated sheets of paper were to set the contact angle between the frictional separating roller and paper to be turned to not more than about 45°.

The mounting position and sizes of the frictional separating roller and the shape of the frictional portion are determined on the basis of the results of this analysis so as to form a gap between the uppermost paper and the remaining paper and carry out the separation of a single sheet of paper reliably.

Figure 36:
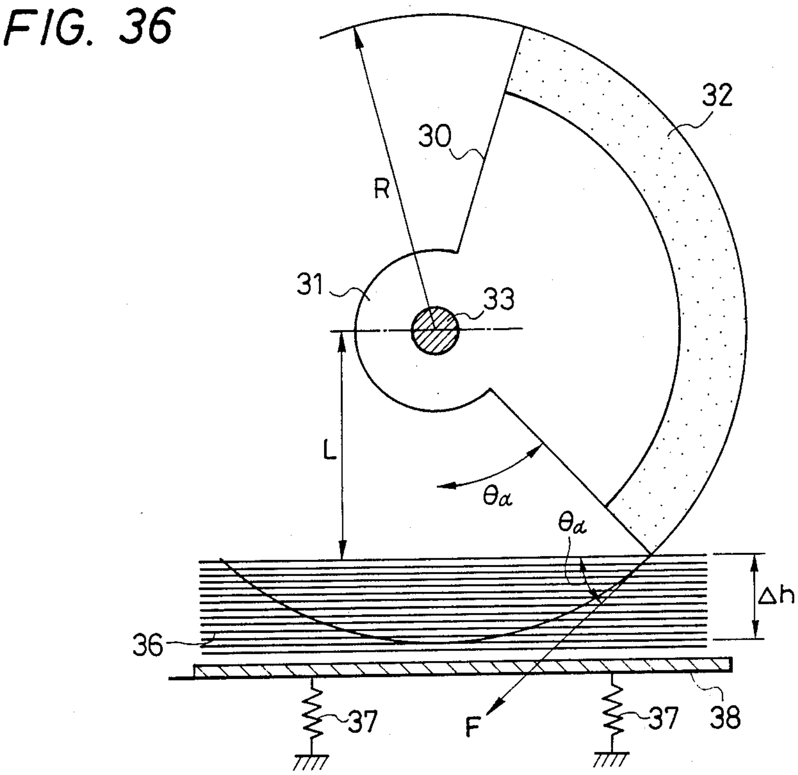

FIG. 36 is a construction diagram illustrating how set the contact angle of the friction 1 separating roller within an arbitrary range of levels. When a frictional separating roller 30 consisting of a roller body 31 and a frictional portion 32 and supported rotatably on a shaft 33 contacts the laminated paper 36, the contact angle $\theta$ becomes $\theta\alpha$ in FIG. 36. When the shortest distance L between the center of rotation of the frictional separating roller 30 and the laminated paper 36, and the distance between the section of the frictional portion 32 which first contacts the paper 36 during the turning of the roller 30, i.e. The radius of curvature R of the frictional portion 32 have relation of L=R, i.e. $\Delta h$=O, $\theta\alpha$=O. However, in practice, the thickness $\Delta h$ of the lamination of the paper 36 varies. In order to laminate the paper up to the limit thickness, it is necessary that $\Delta h$ be set to $\Delta h \leqq R\text{-}L$. To determine this limit thickness $\Delta h$, the contact angle $\theta$ described in the paragraph with reference to FIG. 32 has to be taken into consideration. The relation between $\Delta h$ and $\theta\alpha$ is $\Delta h = R(1\text{-}\cos\theta\alpha)$. In view of $\Delta h \leqq R\text{-}L$ and $\Delta h = R(1\text{-}\cos\theta\alpha)$, it is necessary that $L \geqq R\cos\theta$.

The paper 36 is laminated on a pressing plate 38 to which a predetermined level of pressing force is applied by a spring 37. The pressing force of the spring 37 is regulated to vary the position of the pressing plate 38 and thereby set the contact angle $\theta\alpha$ to not larger than about 45°.

Figure 37:
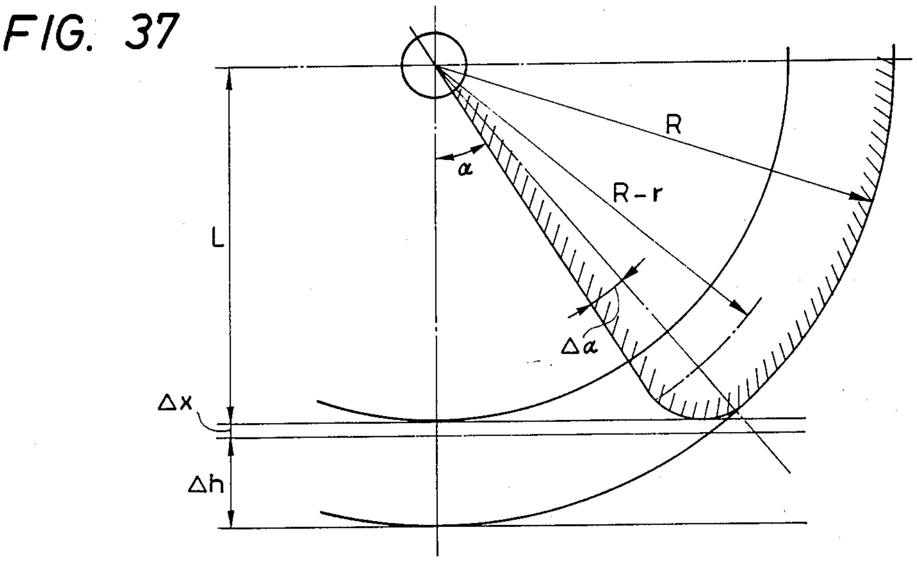

FIG. 37 illustrates a system for chamfering the page turning roller so as to deal with the variations $\Delta x$ in the thickness $\Delta h$ of the lamination of paper. The end section of the frictional portion having a radius of curvature R is chamfered at a radius of curvature r. An arbitrary angle $\alpha$ not larger than the contact angle $\theta$ determined on the basis of what is shown in FIG. 32 is determined as the upper limit of the contact angle. In such a case, the thickness $\Delta h$ of the lamination of paper is determined in accordance with the equation $\Delta h = R(1\text{-}\cos\alpha)$. In practice, it is necessary in many cases that the contact angle $\alpha$ be set to not larger than $\alpha°$ with respect to the thickness h of the lamination of paper, which is obtained by adding a maximum variation quantity $\Delta x$ to the actual thickness h of the lamination of paper. In this case, the maximum variation quantity $\Delta x$ shall be $\Delta x = h\text{-}\Delta h$. In order to keep the contact angle at not larger than $\alpha°$ even if $\Delta x$ exists, it is necessary to determine $\Delta x$, $\Delta\alpha$ and r which satisfies the following equation. The $\Delta\alpha$ represents the angle of the position, in which the chamfering is to be done, with respect to the end of the frictional portion.

$$\Delta x = (R\text{-}r)(1-\cos(\alpha+\Delta\alpha))\text{-}\Delta h$$

For example, when R=15 mm, r=5 mm, $\alpha$=20° and $\Delta\alpha$=20°, $\Delta x$=1.43 mm. In the ordinary designing of the frictional roller, it is important to determine the upper limit of the contact angle. It is set to not more than 20° in view of the safety of a page turning operation. Accordingly, when R is not less than 10 mm with r not less than 3 mm, $\Delta x$ can be set to not less than 1 mm.

Figure 38:
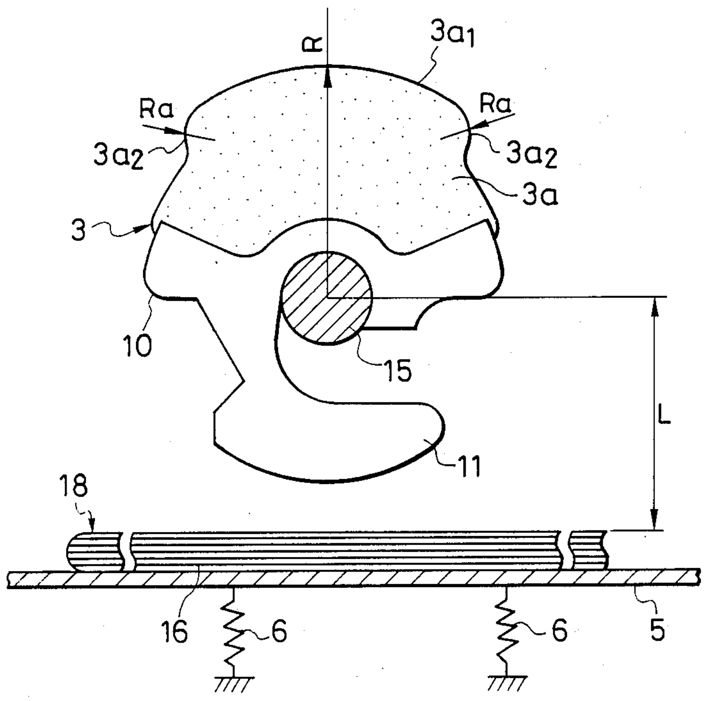

The optimum shape and mounting position of a page turning roller in the page turning apparatus will now be described with reference to FIG. 38.

In the page turning apparatus, a predetermined level of pressing force is applied by the spring 6 to the pressing plate. A passbook 18 is placed on the pressing plate 5, and a page turning roller 3 is provided in opposition to the passbook 18. Reference numeral 15 denotes a page turning roller shaft. The page turning roller 3 is formed basically of roller body, and a member of a high frictional resistance, for example, a frictional portion consisting of rubber. The roller body is formed so that it can be mounted on the shaft as shown in the drawing. A frictional member 3a consists of a slope portion 3a1 having a predetermined radius of curvature R, and slope portions 3a2 having a radius of curvature Ra. The radius of curvature Ra is different from the radius of curvature R. A difference between these radii of curvature varies depending upon the distance between the uppermost surface of the passbook 18 and the page turning roller 3, i.e. The thickness $\Delta h$ of the passbook on the pressing plate 5, and is usually set to not less than 3 mm because it is important to set to a suitable level the angle $\theta$ at which the page turning roller 3 being turned contacts the passbook 18. For example, if the radius of curvature Ra is set to Ra=3 mm in a page turning roller 3 of R=15 mm, which is formed so that the contact angle $\theta$ can be kept not larger than 10°, this requirement for the contact angle can be met even when the distance L is reduced by around 0.7 mm. Since the thickness of each paper in a passbook is usually around 0.1 mm, the page turning apparatus can cope with an increase of about seven pieces of paper.

If the page turning roller is made to the above-described shape and mounted on the above-mentioned portion of the shaft, the frictional force to be applied to the passbook can be directed at not more than 45° with respect to the surface of paper to be turned. This prevents a plurality of pieces of paper in the passbook from being turned at once, and enables these pieces of paper to be turned one by one reliably.

What is claimed is:

1. A page turning apparatus turning a page of a booklet having a plurality of pieces of paper held firmly at one end portion of each thereof by a common binding means, comprising a base which guides a booklet being transferred, transfer means for transferring a booklet, said transfer means comprising rollers opposed to each other via said base, and which are provided in at least two positions spaced from each other in a booklet transfer direction, a page turning means positioned on said base for pressing against the upper surface of paper in a booklet and turning up a page of the paper, a pressing means opposed to said page turning means via said base for pressing a booklet during a page turning operation against said page turning means with at least two stepped loads, and a control means for controlling the operations of said transfer means, said page turning means and said pressing means, an operation for turning a page of a booklet being carried out with at least the fixed end portion of the booklet.

2. A page turning apparatus according to claim 1, wherein at least one of said transfer means is positioned on the side of the fixed end portion of a booklet so as to hold the fixed end portion of the booklet thereby during a page turning operation.

3. A page turning apparatus according to claim 2, wherein each of said transfer means comprises a combination of a driving roller, and a follower roller opposed to said driving roller via said base.

4. A page turning apparatus according to claim 1, wherein said pressing means comprises a plurality of pressing plates provided in openings made in said base, and pressing units connected to said pressing plates via resilient members.

5. A page turning apparatus according to claim 1, wherein an operation for turning a page of a booklet is carried out with at least the fixed end portion thereof held by said driving rollers and said follower rollers opposed thereto.

6. A page turning apparatus according to claim 1, wherein guide plates are provided in the vicinity of said transfer means, each of said guide plates having a clearance through which said base and a booklet can be transferred, the free end portion of each of said guide plates being positioned closer to said page turning means than to the relative transfer means, at least the fixed end portion of a booklet being restricted deforming the paper thereof by said base and said guide during an operation for turning a page of the booklet.

7. A page turning apparatus according to claim 1, wherein said page turning means comprises a plurality of page turning rollers mounted on a shaft extending at right angles to the booklet transfer direction, in such a manner that said rollers are spaced from each other, and wherein means are provided for driving said page turning rollers synchronously with said transfer means in accordance with a signal from said control means.

8. A booklet pressing device comprising a member which presses a booklet, which has a plurality of pieces of paper bound together at one end portion of each thereof, against a page turning means with a predetermined load during a page turning operation, a base which guides a booklet being transferred, said base having openings formed therein, a plurality of pressing plates provided in the openings formed in said base, a pressing unit joined to said pressing plates via resilient members, and a control means for operating and controlling said pressing unit, said pressing unit being operated, during a page turning operation, in accordance with a signal outputted from said control means, the level of which is in conformity with the rigidity of the paper to be turned included in a booklet, so as to apply pressing loads selectively to said pressing plates.

9. A booklet pressing device according to claim 8, wherein a booklet comprises a cover, and leaves the rigidity of which is lower than that of said cover, each of the openings in said base being provided with two pressing plates which apply different pressing loads to a booklet via said pressing unit, which is operated in accordance with a signal form said control means, when a cover of a booklet is turned.

10. A booklet pressing device according to claim 8 or 9, where said pressing unit comprises a solenoid which is operated in accordance with a signal from said control means and which applies a load, with which said booklet is pressed, to pressing plates via said resilient members 11. A page turning apparatus which turns a page of a booklet having a plurality of pieces of paper held firmly at one end portion of each thereof by a common binding means, comprising a base adapted to guide a booklet being transferred, transfer means for transferring a booklet guided by said base along a transfer passage, said transfer means comprising rollers opposed to each other via said base, and which are provided in at lest two positions spaced from each other in a booklet transfer direction, a page turning means positioned on said base for pressing against the upper surface of the paper in a booklet and turning up a page of the paper, said page turning means being mounted on a portion of a shaft extending at right angles to the booklet transfer direction which is spaced from the intermediate section thereof and the centerline of the transfer passage to the left or right for turning up the corresponding corner of a page of the booklet, a pressing means opposed to said page turning means via said base for pressing a booklet during a page turning operation against said page turning means, and a control means for controlling the operations of said transfer means, said page turning means and said pressing means, an operation for turning a page of a booklet being carried out with at least the fixed end portion of the booklet held firmly.

12. A page turning apparatus according to claim 11, wherein at least one of said transfer means is positioned on the side of the fixed end portion of a booklet so as to hold the fixed end portion of the booklet thereby during a page turning operation.

13. A page turning apparatus according to claim 11, wherein each of said transfer means comprises a combination of a driving roller, and a follower roller opposed to said driving roller via said base.

14. A page turning apparatus according to claim 11, wherein said pressing means comprises pressing plates provided in openings made in said base, and pressing units connected to said pressing plates via resilient members.

15. A page turning apparatus according to claim 11, wherein an operation for turning a page of a booklet is carried out with at least the fixed end portion thereof held by said driving rollers and said follower rollers opposed thereto.

16. A page turning apparatus according to claim 11, wherein guide plates are provided in the vicinity of said transfer means, each of said guide plates having a clearance through which said base and a booklet can be transferred, the free end portion of each of said guide plates being positioned closer to said page turning means than to the relative transfer means, at least the fixed end portion of a booklet being restricted deforming the paper thereof by said base and said guide plates during an operation for turning a page of the booklet.

17. A page turning apparatus which turns a page of a booklet having a plurality of pieces of paper held firmly at one end portion of each thereof by a common binding means, comprising a base which guides a booklet being transferred, transfer means for transferring a booklet guided by said base along a transfer passage, said transfer means comprising rollers opposed to each other via said base, and which are provided in at least two positions spaced from each other in a booklet transfer direction, a page turning means positioned on said base for pressing against the upper surface of the paper in a booklet and turning up a page of the paper, and mounted on the portion of a shaft extending at right angles to the booklet transfer direction which is spaced from the intermediate section thereof and the centerline of the transfer passage to the left or right for turning up the corresponding corner of a page of the booklet, an elastic member provided on the portion of said shaft which is in the vicinity of said page turning means, so as to project from said page turning means, a page turning member mounted on the portion of said shaft which is spaced from the intermediate section thereof in the direction opposite to the direction in which said paper turning means is spaced from the intermediate section thereof, a pressing means opposed to said page turning means via said base and adapted to press a booklet during a page turning operation against said page turning means, and a control means for controlling the operations of said transfer means, said page turning means and said pressing means, an operation for turning a page of a booklet being carried out with at least the fixed end portion of the booklet held firmly.

18. A page turning apparatus according to claim 17, wherein at least one of said transfer means is positioned on the side of the fixed end portion of a booklet so as to hold the fixed end portion of the booklet thereby during a page turning operation.

19. A page turning apparatus according to claim 17, wherein each of said transfer means comprises a combination of a driving roller, and a follower roller opposed to said driving roller via said base.

20. A page turning apparatus according to claim 17, wherein said pressing means comprises pressing plates provided in openings made in said base, and pressing units connected to said pressing plates via resilient members.

21. A page turning apparatus according to claim 17, wherein an operation for turning a page of a booklet is carried out with at least the fixed end portion thereof held by said driving rollers and said follower rollers opposed thereto.

22. A page turning apparatus according to claim 17, wherein guide plates are provided in the vicinity of said transfer means, each of said guide plates having a clearance through which said base and a booklet can be transferred, the free end portion of each of said guide plates being positioned closer to said page turning means than to the relative transfer means, at least the fixed end portion of a booklet being restricted deforming the paper thereof by said base and said guide plates during an operation for turning a page of the booklet

23. A page turning system which turns a page of a booklet having a plurality of pieces of paper held firmly at one end portion of each thereof by a common binding means, comprising a base which guides a booklet being transferred, a plurality of transfer means each of which comprises a pair of rollers opposed to each other via said base, which transfer means are spaced from each other in a booklet transfer direction, a means for driving said transfer means, a page turning means for pressing against the upper surface of the paper in a booklet for turning up the same paper, a means for driving said page turning means, a means for pressing a booklet against said page turning means during an operation for turning a page of a booklet, a detecting means provided in the vicinity of said transfer means and adapted to detect the position of a booklet being transferred, a detecting means provided in the vicinity of said page turning means and adapted to detect the rotational condition of the same, and a means for controlling said transfer means, said page turning means and said pressing means so as to actuate said driving means in accordance with a signal representative of the driving condition of said driving means and a signal from said detecting means and thereby place said booklet in a position in which said booklet is opposed to said page turning means, actuate said pressing means and thereby press a booklet against said page turning means, actuate said page turning means and thereby carry out a page turning operation, and thereafter transfer the booklet again and thereby complete the turning of the half-turned page of the booklet, and wherein said pressing means is controlled so that, during the turning of a page of said booklet, a pressing load can be switched in a plurality of steps in accordance with the rigidity of the paper to be turned.

24. A page turning system according to claim 23, wherein said control means is provided with an interface unit which receives detected signals a computation unit which computes a control output signal on the basis of each detecting signal received by said interface unit, and an operating unit which actuates each control unit on the basis of the results of the computation.

25. A page turning apparatus comprising a rotatable page turning means for pressing against a booklet, which has a plurality of pieces of paper fixed at one end portion of each thereof by a common binding means, and for turning up the pieces of paper one by one while a force is applied to the fixed end portion of the booklet, said page turning means being camshaped and wherein the shortest distance L between the center of rotation of said page turning means and a booklet is set not more than a difference obtained by subtracting the thickness $\Delta h$ of a lamination of paper, which includes a page to be turned, of a booklet from the distance R between the portion of a frictional member of said page turning means which first contacts the booklet when said page turning means is operated and the center of rotation of said page turning means.

26. A page turning apparatus comprising a rotatable page turning means for pressing against a booklet, which has a plurality of pieces of paper fixed at one end portion of each thereof by a common binding means, and for turning up the pieces of paper one by one while a force is applied to the fixed end portion of the booklet, wherein the shortest distance L between the center of rotation of said page turning means and a booklet is set not more than a difference obtained by subtracting the thickness $\Delta h$ of a lamination of paper, which includes a page to be turned, of a booklet from the distance R between the portion of a frictional member of said page turning means which first contacts the booklet when said page turning means is operated and the center of rotation of said page turning means.

27. A page turning apparatus according to claim 25, wherein said distance L is set not less than $R.\cos\theta$ wherein $\theta$ is the angle between the direction in which the force is applied from said page turning means to a booklet and a direction parallel to the surface of the booklet.

28. A page turning apparatus according to claim 27, wherein said angle $\theta$ is set to not more than 45°.

29. A page turning system for turning a page of a booklet having a plurality of pieces of paper held firmly at one end portion of each thereof by a common binding means, comprising a base for guiding a booklet being transferred, a plurality of transfer means each of which comprises a pair of rollers opposed to each other via said base said transfer means being spaced from each other in a booklet transfer direction, a means for driving said transfer means, a cam shaped, rotatable page turning means for pressing against the upper surface of the paper in a booklet for turning up the same paper, a means for driving said page turning means, a means for pressing a booklet against said page turning means during an operation for turning a page of the booklet, a detecting means provided in the vicinity of said transfer means and adapted to detect the position of a booklet being transferred, a detecting means provided in the vicinity of said page turning means and adapted to detect the rotational condition of the same, and a means for controlling said transfer means, said page turning means and said pressing means so as to actuate said driving means in accordance with a signal representative of the driving condition of said driving means and a signal from said detecting means and thereby place a booklet in a position in which the booklet is opposed to said page turning means, actuate said pressing means and thereby press the booklet against said page turning means, actuate said page turning means and thereby carry out a page turning operation, and thereafter transfer the booklet again and thereby complete the turning of the half-turned page of the booklet.

* * * * *